(12) United States Patent
Mazzapica

(10) Patent No.: US 6,999,126 B2
(45) Date of Patent: Feb. 14, 2006

(54) METHOD OF ELIMINATING HOT SPOT IN DIGITAL PHOTOGRAPH

(76) Inventor: C. Douglas Mazzapica, 5532 Woodruff #404, Lakewood, CA (US) 90713

( * ) Notice: Subject to any disclaimer, the term of this patent is extended or adjusted under 35 U.S.C. 154(b) by 724 days.

(21) Appl. No.: 09/954,326

(22) Filed: Sep. 17, 2001

(65) Prior Publication Data

US 2003/0052990 A1 Mar. 20, 2003

(51) Int. Cl.
*H04N 5/235* (2006.01)
*G03B 13/00* (2006.01)

(52) U.S. Cl. ............... 348/362; 348/221.1; 348/342
(58) Field of Classification Search ........... 348/362, 348/342, 363, 221.1, 229.1; 396/239
See application file for complete search history.

(56) References Cited

U.S. PATENT DOCUMENTS

| | | | |
|---|---|---|---|
| 4,695,888 A | 9/1987 | Peterson | |
| 5,065,247 A | 11/1991 | Haruki | |
| 5,075,778 A | 12/1991 | Saito | |
| 5,099,334 A | 3/1992 | Ogata et al. | |
| 5,249,015 A * | 9/1993 | Takagi et al. | 396/49 |
| 5,347,320 A | 9/1994 | Lim | |
| 5,353,058 A | 10/1994 | Takei | |
| 5,559,555 A | 9/1996 | Shimizu | |
| 5,592,256 A | 1/1997 | Muramatsu | |
| 5,923,372 A | 7/1999 | Han | |
| 6,064,433 A | 5/2000 | Bush et al. | |
| 6,091,908 A * | 7/2000 | Fukuda | 396/234 |
| 6,480,226 B1 * | 11/2002 | Takahashi et al. | 348/296 |
| 6,765,619 B1 * | 7/2004 | Deng et al. | 348/362 |

FOREIGN PATENT DOCUMENTS

JP 370274 * 3/1991

* cited by examiner

Primary Examiner—David L. Ometz
Assistant Examiner—Gevell Selby
(74) Attorney, Agent, or Firm—Stetina Brunda Garred & Brucker

(57) ABSTRACT

A method of eliminating a hot spot of a digital photograph. A light recording area for receiving a light reflected from a scene to be photographed is segmented into a grid of a plurality of squares. Each of the squares is identified with a coordinate. An exposure value of each square is defined. The exposure value of one of the squares is selected as a key exposure value. A neutral density or color with a certain degree is applied to any square that is over-exposed. The over-exposed square has an exposure value larger than the key exposure value with at least a predetermined number of stops.

11 Claims, 3 Drawing Sheets

FLUID ELECTRONIC MASKING GRID

METHOD OF ELIMINATING HOT SPOT IN DIGITAL PHOTOGRAPH

BACKGROUND OF THE INVENTION

The present invention relates generally to eliminate bright spots or hot spots in a digital photograph, and more particularly, to a method of eliminating bright spots or hot spots in a digital photograph using a fluid electronic masking technique.

A digital camera has an image capturing device such as a charge couple device (CCD) to capture an image and to save it to a memory. The exposure step allows the image capture device exposed to the image of the scene to be photographed.

The image capturing device is sensitive to light. If the light reaching the image capturing device is more than necessary, the image capturing device is over-exposed. As a result, a white-out image (a hot spot or a bright spot) is recorded. On the contrary, if the light reaching the scene is insufficient, an under-exposed situation is caused.

To obtain a properly exposed image recorded in the digital camera, the exposure value has to be controlled or adjusted. In many applications such as digital still cameras, digital video cameras, film and print scanners and motion picture transfer systems that convert a light image into a recordable image, overall exposure adjustment and color shift can be achieved. However, to eliminate a hot spot or bright spot occurring only at a local area of the scene to be photographed, one can only reduce the overall exposure value of the entire scene or image. As a result, although the hot spot or bright spot may be eliminated, a clear picture of the remaining objects in the photograph may not be obtained.

BRIEF SUMMARY OF THE INVENTION

To allow the elimination of hot spots or bright spots without reducing the overall exposure value of an object to be photographed, a fluid electronic masking technique is applied. The fluid electronic masking provides a neutral density filter to a local area of which a hot spot or a bright spot occurs due to an exceeding stop value. Thereby, the spot value of the local area is reduced, and consequently, the hot spot or bright spot is eliminated without reducing the stop value in other areas of the object.

In one embodiment of the invention, the method of eliminating a hot spot or a bright spot includes the following steps. When a scene is to be photographed, a recording area receiving and recording the light reflected from the scene is segmented into a fluid electronic masking grid with a plurality of squares. The squares are identified by a coordinate, for example, an x- and y-axis coordinate. Each of the squares is able to define the exposure value thereof. A key exposure value is determined by selecting among the exposure values of the squares. The exposure value of each square is then compared to the key exposure value. When the exposure value of one square is larger than the key exposure value with a certain degree, for example, is more than two stops larger, a neutral density filter is applied to the square. For example, when the exposure value of the square is 5 stops larger than the key exposure value, a neutral density filter with 3 stops is applied.

In another embodiment, instead of applying a neutral density filter, a color shift is used to improve the chromacity of a photograph. For example, when an object in a background having a stop value three to four times larger than that of the object is to be photographed, the much larger stop value may render a white background. If a blue background is required, a certain percentage of blue may be applied to create a new image that replaces the over-exposed white area.

The above method of eliminating hot spots or bright spots and improving chromacity can be applied to the same photograph taking event. While imaging a scene, it is possible that certain part of the scene requires a neutral density to eliminate the hot spot or bright spot, certain part requires a percentage of color to obtain a better chromacity, or some part may even require both a neutral density and a color to obtain a better quality of image.

BRIEF DESCRIPTION OF THE DRAWINGS

These, as well as other features of the present invention, will become more apparent upon reference to the drawings wherein.

DETAILED DESCRIPTION OF THE INVENTION

As mentioned above, digital still cameras, digital video cameras, the film & print scanners and motion picture transfer systems that reproduce images in a digital format presented to them convert light into recordable images. Currently, when any over-exposed area causing a hot spot or a bright spot of a scene to be photographed is detected, the hot spot or bright spot can be eliminated only by reducing the overall exposure value, or applying a color shift to the whole scene.

To form an image on the image capturing device of the digital camera, a lens is required. To control or adjust the exposure value (EV), also called the light value, of the image capturing device, two factors, the aperture of the lens and a shutter speed which controls the specific time that the image capturing device is exposed by an incoming light, are considered. The exposure value can be expressed by the following equation:

$$EV = \log_2\left[\frac{(Aperture)^2}{shutterspeed}\right]$$

Therefore, to maintain a constant exposure value, a combination of wider aperture and faster shutter speed, or a combination of narrower aperture and slower shutter speed can be used. The current cameras are designed with the standard sequences of lens aperture as f/1.0, f/1.4, f/2.0, f/2.8, f/4, f/5.6, f/8, . . . and shutter speed as 8, 4, 2, 1, ½, ¼, ⅛. Consequently, a sequence of exposure value can be obtained as 0, 1, 2, 3, 4, 5, 6 , 7, . . . .

The difference between two consecutive exposure values is called a stop. With a modern design of camera or other image processor, non-integer stops may also be obtained. That is, the combination of aperture and shutter speed other than the standard sequence as above is also available. As the aperture is inversely proportional to the brightness of the light entering the camera, the increment of one stop (+1 stop) indicates that the amount of light that can pass through is doubled. That is, two stops have twice the light value (exposure value) as one stop, and three stops have four times the light value as one stop.

The present invention measures the numbers of stops in different area of the image capturing device, that is, the light recording area while photographing a scene with an object. By selecting the stop number of the object as a key exposure value, the stop numbers measured in other areas of the scene are compared to the key exposure value. When the difference between the key exposure value and the stop number in other areas is larger than a predetermined value, a neutral density is applied.

Figure 1:
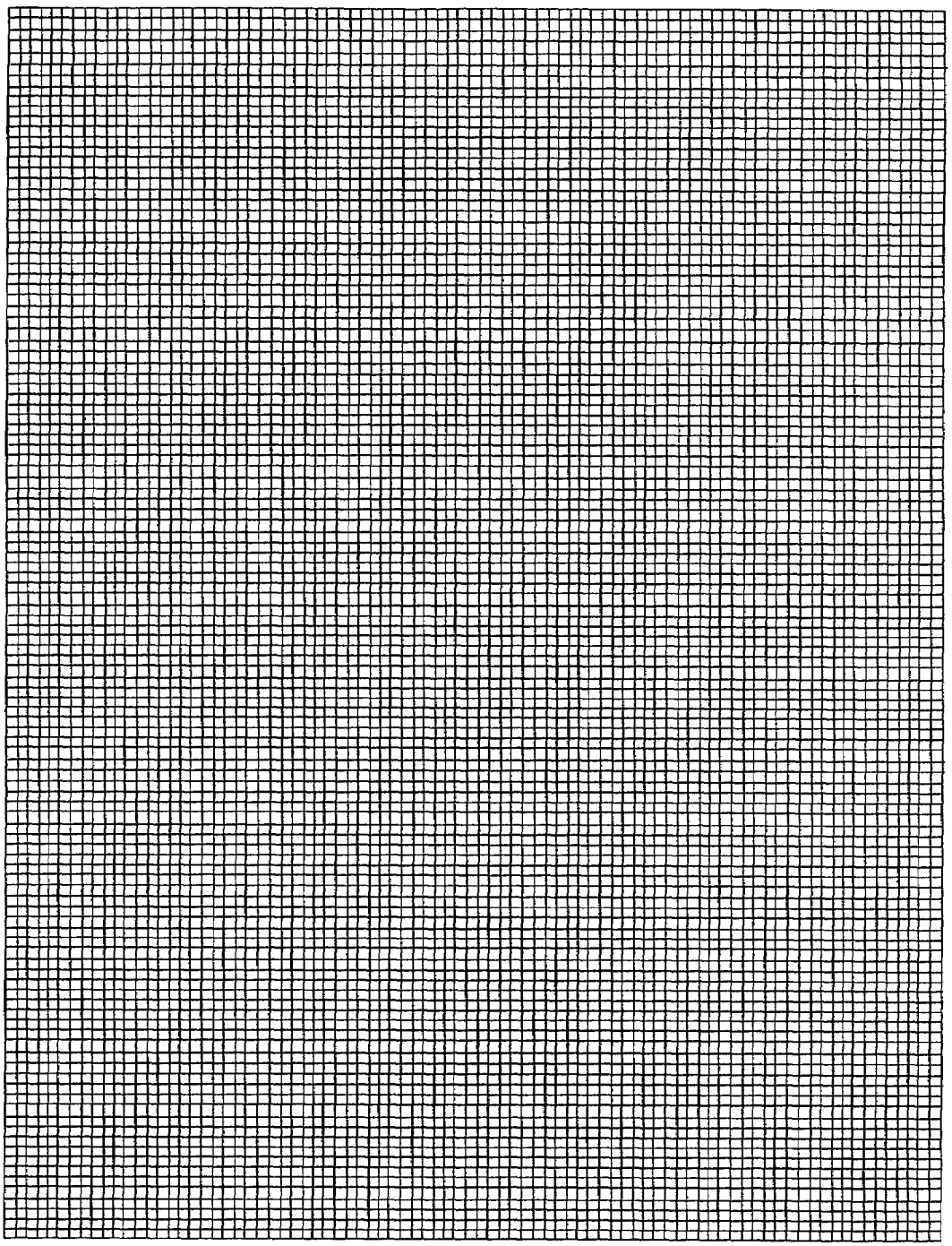
FIG. 1 shows a 10 time enlarged view of a fluid electronic masking grid of 1080 squares.
Figure 2:
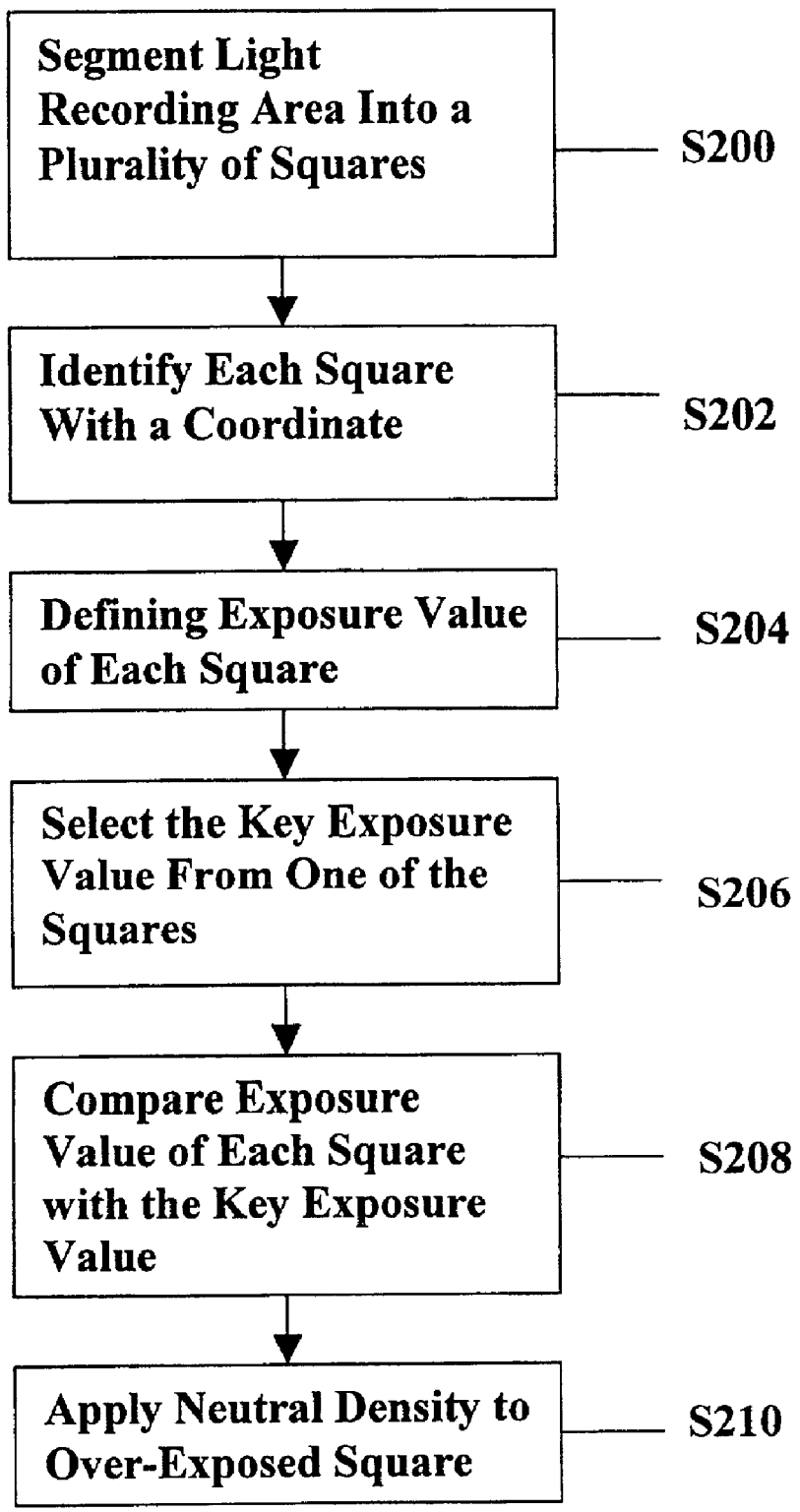
FIG. 2 shows a flow chart for eliminating hot spot or bright spot.

FIG. 2 shows the process flow of using a fluid electronic masking technique to eliminate the hot spot or bright spot in one embodiment of the invention. In FIG. 2, when a scene is to be photographed, the light recording area is exposed to the scene. In step S200, the light recording area is segmented into a grid of a plurality of squares, for example, 1080 squares. FIG. 1 shows an example of the grid with 1080 squares times larger than the actual size. It will be appreciated that the number of squares can be changed according to the sophistication of the device. In step S202, the squares are identified with a coordinate, for example, an x- and y-axis coordinate. In step S204, the exposure value in terms of the stop number for each square is measured. In step S206, the stop number of one square is selected as the key exposure value. For example, when a person is photographed in the scene, the face of the person may be used as a reference point, and the stop number measured at the square where the face locates is selected as the key exposure value. In step S208, the stop number measured from each square is compared to the key exposure value. In step S210, when any square of the grid has the exposure value larger than the key exposure value with at least a predetermined stop number, for example, 2 stops, this square is over exposed, a neutral density filter is then applied thereto.

For example, when the exposure value of the over-exposed square is larger than the key exposure value with 5 stops, 3 stops of neutral density is applied. It will be appreciated that the stops of neutral density are determined according to the specific requirement of the photograph, or the preference of the photographer without being limited to this example.

When a square of the grid is over-exposed, but the exposure value on the border thereof is normal, a hard edge is displayed in the image. Therefore, a special degree of neutral density filter is applied to the square. Such neutral density filter contains a neutral density graduated along a direction from left to right, right to left, bottom to top, or top to bottom depending on relationship of the square with the key exposure and the over-exposed square.

As the over-exposed square is the only position where the hot spot and bright spot occurs, by adding a neutral density on this particular area of the light recording area does not only eliminate the hot spot or bright spot, but also maintains the remaining areas of the light recording area with a sufficient exposure value. As a result, one can obtain high fidelity definition of the scene to be photographed.

In addition to eliminate the hot spot or bright spot from a picture, one can also improve the chromacity of a picture by the present invention. For example, when one is photographing a tall building with a very bright sky as a background, the very bright sky may result in an exposure value too large to render a white background in the picture. One can thus apply a percentage of blue color to the over-exposed area to obtain a picture of a tall building with a deep blue sky as the background.

Figure 3:
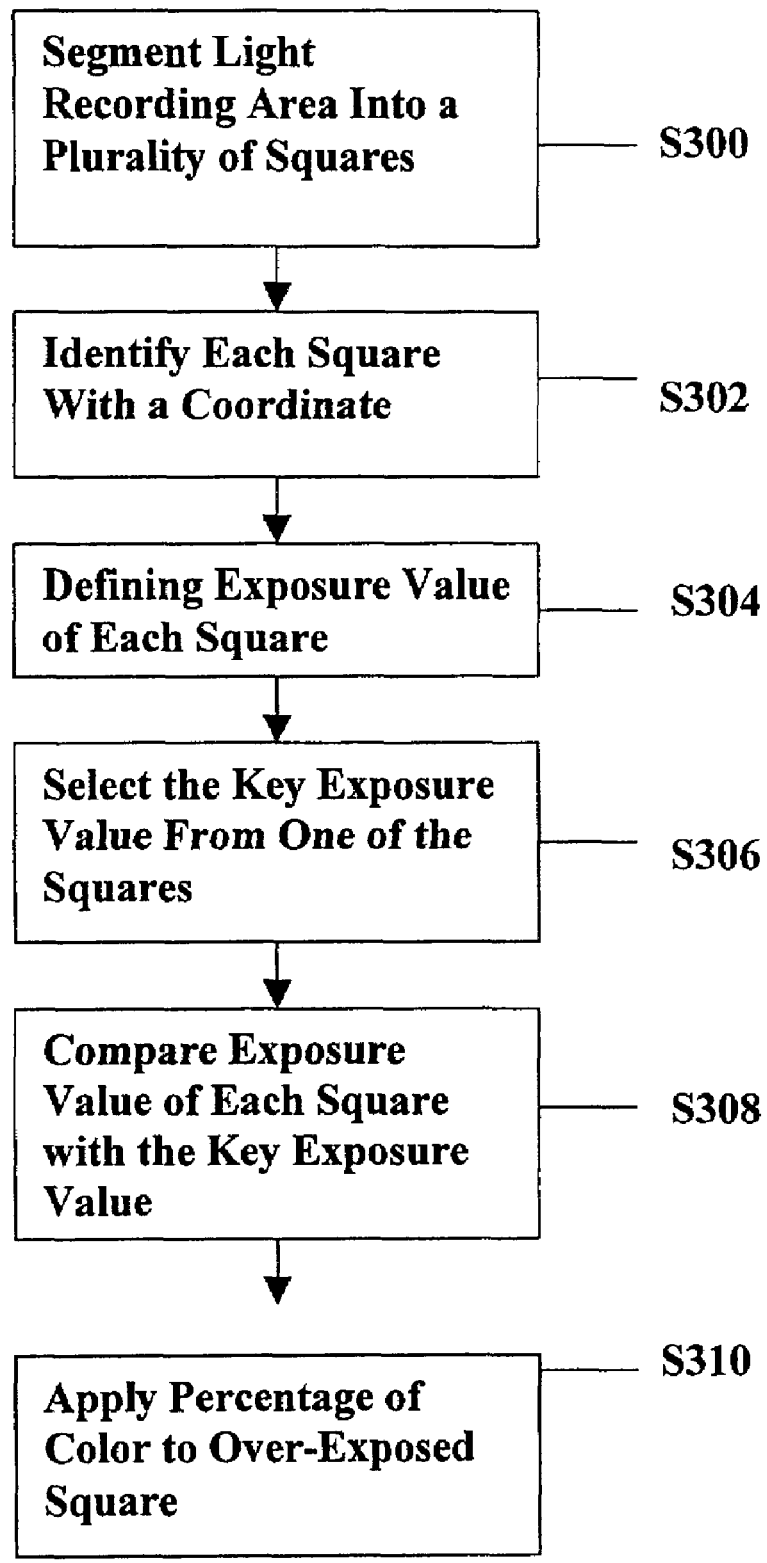
FIG. 3 shows a flow chart for eliminating an over-exposed white area.

The steps for color compensation are similar to the steps of eliminating hot spots or bright spots. A flow chart of the method is illustrated in FIG. 3. In step S300, the light recording area is segmented into a grid of a plurality of squares, again, for example, 1080 squares. FIG. 1 shows an example of the grid with 1080 squares times larger than the actual size. It is appreciated that the number of the squares is can be changed according to the sophistication of the device. In step S302, the squares are identified with a coordinate, for example, an x- and y-axis coordinate. In step S304, the exposure value in terms of the stop number for each square is measured. In step S306, the stop number of one square is selected as the key exposure value. For example, when a person is photographed in the scene, the face of the person may be used as a reference point, and the stop number measured at the square where the face locates is selected as the key exposure value. In step S308, the stop number measured from each square is compared to the key exposure value. In step S310, when any square of the grid has the exposure value larger than the key exposure value with at least a predetermined stop number, for example, 2 stops, this square is over exposed, a percentage of color is added to the over-exposed square.

Further, a neutral density may also be applied to the over-exposed square in addition to the over-exposed square. The percentage of the color and the stops of neutral density are determined according to the specific requirement of the photograph, or the preference of the photographer.

Again, when a square of the grid is over-exposed, but the exposure value on the border thereof is normal, a hard edge is displayed in the image. Therefore, a special degree of color filter is applied to the square. Such neutral color filter contains a color graduated along a direction from left to right, right to left, bottom to top, or top to bottom depending on relationship of the square with the key exposure and the over-exposed square.

As the digital device converts the light reflected from the scene into digital images, the neutral density or color is added at the same time when the image of the scene is created.

A software stored in the digital camera is used for segmenting the entire light recording area into the fluid electronic masking grid. All segments (squares) are active and ready to accept a value of neutral density or color. After the key exposure square is selected, only the over exposed square will accept the new information of.

The above method can be applied to digital camera, digital video camera, film scanners and other digital image processing systems.

Indeed, each of the features and embodiments described herein can be used by itself, or in combination with one or more of other features and embodiment. Thus, the invention is not limited by the illustrated embodiment but is to be defined by the following claims when read in the broadest reasonable manner to preserve the validity of the claims.

What is claimed is:

1. A method of eliminating a bright spot of a digital photograph, comprising:
   segmenting a light recording area of a scene to be photographed into a grid of a plurality of squares;
   identifying each of the squares by a coordinate;
   defining an exposure value of each square;
   selecting the exposure value of one of the squares as a key exposure value;
   providing a neutral density with a certain degree to any square that is over-exposed, wherein the over-exposed square has an exposure value larger than the key exposure value with at least a predetermined number of stops.

2. The method according to claim 1, wherein the predetermined number of stops includes 2 stops.

3. The method according to claim 2, wherein the certain degree of the neutral density includes the predetermined number of stops.

4. The method according to claim 1, further comprising a step of applying a gradual neutral density at a border of the over-exposed square.

5. The method according to claim 4, wherein the gradual neutral density is graduated along a direction between the square with the key exposure to the over-exposed square.

6. A method of eliminating a bright spot of a digital photograph, comprising:
   configuring a scene to be photographed into a grid of a plurality of squares;
   identifying each of the squares by a coordinate;
   defining an exposure value of each square;
   selecting the exposure value of one of the squares as a key exposure value;
   assigning a percentage of color to any square that is over-exposed, wherein the over-exposed square has an exposure value larger than the key exposure value with at least a predetermined number of stops.

7. The method according to claim 6, wherein the predetermined number of stops includes 2 stops.

8. The method according to claim 7, further comprising a step of applying a neutral density filter to the over-exposed square.

9. The method according to claim 8, wherein the neutral density filter has a neutral density the same of the predetermined number of stops.

10. The method according to claim 6, further comprising a step of applying a gradual neutral density at a border of the square.

11. The method according to claim 10, wherein the gradual neutral density is graduated along a direction from the square with the key exposure to the over-exposed square.

* * * * *